US006924901B1

(12) United States Patent
Otsubo et al.

(10) Patent No.: US 6,924,901 B1
(45) Date of Patent: Aug. 2, 2005

(54) COMMUNICATION SYSTEM, IMAGE FORMING APPARATUS, INITIALIZATION METHOD, TROUBLE COMPENSATION METHOD AND STORAGE MEDIUM

(75) Inventors: Toshihiko Otsubo, Tokyo (JP); Takashi Soya, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/567,493

(22) Filed: May 8, 2000

(30) Foreign Application Priority Data

May 10, 1999 (JP) .......................................... 11-128262
May 31, 1999 (JP) .......................................... 11-151955

(51) Int. Cl.[7] .......................... G06K 15/02; B41J 29/38

(52) U.S. Cl. .......................... 358/1.13; 358/468; 347/5; 340/539.3

(58) Field of Search .......................... 358/1.1, 1.2, 1.3, 358/1.4, 1.5, 1.6, 1.7, 1.8, 1.9, 1.11, 1.12, 1.13–1.15, 1.16, 1.17, 1.18, 468; 347/5; 713/321; 340/539.3; 700/22, 297; 399/88; 710/1

(56) References Cited

U.S. PATENT DOCUMENTS 4,567,482 A * 1/1986 Dolsen et al. .............. 370/222
5,297,287 A * 3/1994 Miyayama et al. ............ 713/1
5,325,376 A * 6/1994 Ushio et al. ................ 714/811
5,331,387 A * 7/1994 Okada et al. ............... 399/385
5,747,889 A * 5/1998 Raynham et al. ............. 307/80
5,758,185 A * 5/1998 Takano ........................ 710/10

* cited by examiner

*Primary Examiner*—King Y. Poon
(74) *Attorney, Agent, or Firm*—Rossi, Kimms & McDowell LLP

(57) ABSTRACT

There is provided a communication system which is capable of resetting sub-communication ICs without providing special reset signal lines for transmitting a reset signal and also capable of properly transmitting a communication reset signal to the sub-communication ICs to reset the same when the system is in an abnormal state or when the power supply is turned off, an image forming apparatus provided with this communication system, an initialization method, and a storage medium that contains a program for executing the method. A host CPU controls the whole communication system. A communication controller controls a serial communication. A plurality of sub-communication ICs transmit serial data between themselves and the communication controller. A first reset IC resets the host CPU, and a second reset IC rests the communication controller. The first and second ICs reset the host CPU and the communication controller, respectively, according to different setting conditions. More specifically, the first reset IC resets the host CPU when the power supply voltage of the communication system is lower than a first predetermined value, and the second reset IC resets the communication controller when the power supply voltage is lower than a second predetermined value that is lower than the first predetermined value.

7 Claims, 15 Drawing Sheets

BACK

FRONT

COMMUNICATION SYSTEM, IMAGE FORMING APPARATUS, INITIALIZATION METHOD, TROUBLE COMPENSATION METHOD AND STORAGE MEDIUM

BACKGROUND OF THE INVENTION

1. Field of the Invention

The present invention relates to a communication system that performs a serial transmission of data between a communication control means and a plurality of sub-communication means, an image forming apparatus provided with this communication system, an initialization method, a trouble compensation method, and a storage medium that contains a program for executing the method.

2. Description of Related Art

There is known a serial communication apparatus, in which a transmitting apparatus and a receiving apparatus operate independently of one another. To reset the receiving apparatus in this serial communication apparatus, there is provided a special reset signal line between the transmitting apparatus and the receiving apparatus, and a reset signal is transmitted from the transmitting apparatus to the receiving apparatus through the reset signal line to thereby reset the receiving apparatus (first prior art).

Another serial communication apparatus has been proposed (second prior art). FIG. 1 is a block diagram showing the construction of an example of this serial communication system. In FIG. 1, the serial communication system is constructed in such a manner that a communication controller 402, a sub-communication IC 410 connected to a motor driver 412 for driving a motor 413, and a sub-communication IC 411 to which a plurality of sensors 414 are connected are cascade-connected through a pair of communication lines comprised of a synchronization line (CLK) and a data (DATA) line for serial transmission.

Eight sub-communication ICs at the maximum can be connected to a pair of communication lines, and a proper address (address 0, address 1, . . . , address 7) can be designated for each sub-communication IC. In the example of FIG. 1, two sub-communication ICs 410, 411 are connected to the pair of communication lines. There are eight data registers 0–7 in the communication controller 402, and these data registers 0–7 correspond to the proper addresses (address 0–address 7) of the sub-communication ICs, respectively.

A serial communication control part 403 of the communication controller 402 controls the transmission to the sub-communication ICs 410, 411 and the receipt from the sub-communication ICs 410, 411. The communication controller 402 transmits or receives data to or from the sub-communication ICs 410, 411 corresponding to the data registers. The data are transmitted from the communication controller 402 to the sub-communication ICs 410, 411 through a transmitting buffer 405 and a shift register 406, and the data are received from the sub-communication ICs 410, 411 to the communication controller 402 through a shift register 408 and a receiving buffer 407. A core part 404 is capable of controlling the serial communication control part 403 according to a program which has been prepared in advance.

FIG. 2 is a block diagram showing the construction of an example of the serial communication system in FIG. 1, which is built in an image forming apparatus 500 such as a copying machine. In FIG. 2, a host CPU 501 is connected to a communication controller 502 through an address bus, a data bus and a control signal bus. A sub-communication IC 503 to which is connected a motor driver 507 for driving a motor 508 arranged at a proper position in the apparatus, a sub-communication IC 504 to which are connected a plurality of drivers 509 for driving a plurality of clutches 510, and sub-communication ICs 505, 506 to which are connected a plurality of sensors 511, 512 are connected to the communication controller 502 through a pair of communication lines. FIG. 2 does not illustrate a power supply voltage or ground.

In accordance with a transmitting command or a receiving command from the host CPU 501, data are transmitted between the communication controller 502 and the sub-communication ICs 503–506. Regardless of the positions of the sub-communication ICs 503–506 in the apparatus, a proper address (address 0, address 1, address 2, . . . ) is designated for each sub-communication IC. The communication controller 502 designates the address in a communication frame (pulse train) to thereby transmit and receive the data to and from the sub-communication IC corresponding to the address.

There will now be explained the outline of the operation of the serial communication system constructed as above. To transmit predetermined phase data to run the motor 508, the host CPU 501 sets a transmission flag (not shown in the drawing) in the communication controller 502, and writes the transmission data in a data register 0. When the transmission data is written in the data register, the communication controller 502 transmits a pulse train of a predetermined frequency to a CLK line. In synchronism with the pulse train, the communication controller 502 and the sub-communication IC 503 transmit the data in the data register 0 according to a transmission data format shown in FIG. 3.

In FIG. 3, the sub-communication IC 503 recognizes the start of the transmission at a first fall of CLK transmitted from the communication controller 502, and confirms whether the communication controller 502 transmits a start bit of "L" to a DATA line at a next rise of CLK. According to data received at a next fall of CLK, the sub-communication IC 503 determines whether to perform data transmission ("L") or data receipt ("H").

Data A0–A2 of next three clocks are address bits, and the communication controller 502 transmits addresses A0–A2 onto the DATA line. If the addresses A0–A2 are the address of the sub-communication IC 503, the sub-communication IC 503 captures data of eight bits (D7–D0) on the DATA line, which are transmitted in synchronism with subsequent CLKs.

At a next fall of CLK, the sub-communication IC 503 captures parity data (PA) transmitted from the communication controller 502 at the next fall of CLK, and compares the captured parity data with parity data (PA) which is calculated by the sub-communication IC 503 from the data (D7–D0). If the parity data correspond to one another, the data (D7–D0) are determined as being effective, and ACK ("L") is transmitted to the communication controller 502. If the parity data do not correspond to one another, the sub-communication IC 503 determines the data (D7–D0) as being ineffective and transmits ACK ("H") to the communication controller 502.

At a rise of CLK, the communication controller 502 receives the ACK. If the ACK is "L", the communication controller 502 transmits a stop bit of "L" at a fall of CLK after the next. If the ACK is "H", the communication controller 502 transmits a stop bit of "H" at a fall of CLK after the next. The designated sub-communication IC recognizes the stop bit at a rise of the CLK. If the stop bit is "L", the sub-communication IC outputs data, and if the stop bit is "H", the sub-communication IC does not output data. In the above sequence, the data are transmitted between the communication controller 502 and the sub-communication IC 503 to run the motor 508.

There will now be explained the data receiving operation for reading a value of the sensor 511 connected to the sub-communication IC 505. To receive the data, the host CPU 101 sets a receiving flag (not shown in the drawing) in the communication controller 502. When the receiving flag is set, the communication controller 502 transmits a pulse train of a predetermined frequency to the CLK line. In synchronism with the pulse train, the communication controller 502 and the sub-communication IC 505 receive the data according to a receiving data format shown in FIG. 4.

In FIG. 4, the sub-communication IC 505 recognizes the start of the transmission at a first fall of CLK transmitted from the communication controller 502, and confirms whether the communication controller 502 transmits a start bit of "L" to the DATA line at a next rise of CLK. According to data received at a next fall of CLK, the sub-communication IC 505 determines whether to perform data transmission ("L") or data receipt ("H").

Data A0–A2 of next three clocks are address bits, and the communication controller 402 transmits addresses A0–A2 onto the DATA line. If the addresses A0–A2 are the address of the sub-communication IC 505, the sub-communication IC 505 transmits the data of the sensor 511 to the communication controller 502 from a next CLK. The designated sub-communication IC 505 transmits data of eight bits (D7–D0) onto the DATA line at a fall of CLK, and the communication controller 502 captures the data (D0–D7) at a rise of CLK.

At a next rise of CLK, the communication controller 502 captures parity data (PA) transmitted from the sub-communication IC 505 at the next fall of CLK, and compares the captured parity data with parity data (PA) which is calculated by the communication controller 502 from the data (D7–D0). If the parity data correspond to one another, the data (D7–D0) are determined as being effective, and if the parity data do not correspond to one another, the data (D7–D0) are determined as being ineffective. In the above sequence, the data are transmitted to the sub-communication IC 505 to read the value of the sensor 511.

There will now be explained how the sub-communication ICs 503–506 are reset by the communication. The host CPU 501 sets a communication reset flag (not shown in the drawing) in the communication controller 502. When the communication flag is set, the communication controller 502 transmits a predetermined reset pulse train as shown in FIG. 5 to the CLK line and the data line. The sub-communication ICs 503–506 are reset immediately upon the receipt of the reset pulse train.

Accordingly, many motors and sensors arranged in many parts of the apparatus can be operated and the information can be read through four signal lines that are cascade-connected. In the above example according to the prior art, one address is comprised of 8 bits, and the information of eight bits is transmitted between the communication controller and the sub-communication ICs. This, however, may be changed to an optimum structure according to rules of a communication data format. If there are provided a plurality of communication controller functions, an increased number of sub-communication ICs can be provided by increasing signal lines corresponding to the communication controller functions. Moreover, since the sub-communization ICs can be reset by the communication, this eliminates the necessity of providing a special reset signal line between the communication controller and the sub-communication ICs.

The above-described prior arts, however, have disadvantages as stated below.

According to the first prior art, a special reset signal line is needed to transmit the reset signal in order to reset the communication controller.

According to the first prior art, when the reset signal line is broken or the like in the case where the reset signal is transmitted through the special reset signal line, the power is supplied to loads connected to the receiving sub-communication ICs although the situation is abnormal. This makes it impossible to protect the loads.

According to the second prior art, in an abnormal state wherein the host CPU runs out of control or a communication reset signal is continuously supplied to the communication controller, or when the power supply is off, the communication reset signal may not be normally transmitted to the sub-communication ICs. This makes it impossible to protect the loads at the receiving side.

SUMMARY OF THE INVENTION

It is a first object of the present invention to provide a communication system which is capable of resetting sub-communication ICs without providing special reset signal lines for transmitting a reset signal and also capable of properly transmitting a communication reset signal to the sub-communication ICs to reset the same when the system is in an abnormal state or when the power supply is turned off, an image forming apparatus provided with this communication system, an initialization method, and a storage medium that contains a program for executing the method.

It is a second object of the present invention to provide a communication system which is capable of protecting loads from operating abnormally when the communication system is in an abnormal state, an image forming apparatus provided with this communication system, an initialization method, a trouble compensation method, and a storage medium that contains a program for executing the method.

To attain the first object, according to a first aspect of the present invention, there is provided a communication system comprising main control means for controlling the whole communication system, communication control means for controlling a serial communication, a plurality of sub-communication means for transmitting serial data between themselves and the communication control means, first initialization means for resetting the main control means, and second initialization means for resetting the communication control means, wherein the first initialization means and the second initialization means reset the main control means and the communication control means, respectively, according to different setting conditions.

Preferably, the first initialization means resets the main control means when a power supply voltage of the communication system is lower than a first predetermined value, and the second initialization means resets the communication control means when the power supply voltage of the communication system is lower than a second predetermined value that is lower than the first predetermined value.

More preferably, when a power supply of the communication system is turned on, the second initialization means cancels the reset of the communication control means if a power supply voltage of the communication system becomes equal to the predetermined value, and the first initialization means cancels the reset of the main control means if the power supply voltage becomes equal to the first predetermined value with passage of time, and when the power supply is turned off, the first initialization means resets the main control means if the power supply voltage becomes equal to the first predetermined value, and the second initialization means resets the communication control means if the power supply voltage becomes equal to the second predetermined value with passage of time.

In a preferred embodiment of the first aspect, the main control means controls communication of the communication control means, and transmits and receives communication data to and from the communication control means.

In a preferred embodiment of the first aspect, the communication control means and the plurality of sub-communication means are cascade-connected through a serial communication line.

In a preferred embodiment of the first aspect, the communication control means transmits reset data as predetermined serial data to the plurality of sub-communication means to thereby reset the plurality of sub-communication means.

In a preferred specific form of the first aspect, the communication control means has a reset terminal for receiving a reset signal and an external input terminal for receiving an externally generated reset signal, the communication control means transmitting the reset data to the plurality of sub-communication means when the reset of the communication control means is cancelled and when the externally generated reset signal is received.

More specifically, the first initialization means outputs a first reset signal to the external input terminal of the communication control means, the second initialization means outputs a second reset signal to the reset terminal of the communication control means, and the communication control means transmits the reset data to the plurality of sub-communication means when the second reset signal from the second initialization means is cancelled or when the first reset signal from the first initialization means is effective.

According to the communication system of the first aspect, when the system voltage is lower than the first predetermined value, the main control means is reset by the first initialization means, and when the system voltage is lower than the second predetermined value lower than the first predetermined value, the communication control means is reset by the second initialization means. In other words, there is provided a difference between the resetting potential of the first initialization means and the resetting potential of the second initialization means so that when the power supply is turned on, the communication control means can be operated earlier than the main control means, and when the power supply is turned off, the communication control means can continue to be operated later than the main control means. As a result, the sub-communication means can be reset without providing special reset signal lines for transmitting a reset signal, and a communication reset signal can also be properly transmitted to the sub-communication means to reset the same when the system is in an abnormal state or when the power supply is turned off.

To attain the first object, according to a second aspect of the present invention, there is provided an image forming apparatus comprising main control means for controlling an entire communication system, communication control means for controlling a serial communication, a plurality of sub-communication means for transmitting serial data between themselves and the communication control means, first initialization means for resetting the main control means, and second initialization means for resetting the communication control means, wherein the first initialization means and the second initialization means reset the main control means and the communication control means, respectively, according to different setting conditions.

Preferably, the first initialization means resets the main control means when a power supply voltage of the communication system is lower than a first predetermined value, and the second initialization means resets the communication control means when the power supply voltage of the communication system is lower than a second predetermined value that is lower than the first predetermined value.

More preferably, when a power supply of the image forming apparatus is turned on, the second initialization means cancels the reset of the communication control means if a power supply voltage of the image forming apparatus becomes equal to the predetermined value, and the first initialization means cancels the reset of the main control means if the power supply voltage becomes equal to the first predetermined value with passage of time, and when the power supply is turned off, the first initialization means resets the main control means if the power supply voltage becomes equal to the first predetermined value, and the second initialization means resets the communication control means if the power supply voltage becomes equal to the second predetermined value with passage of time.

In a preferred embodiment of the second aspect, the main control means controls communication of the communication control means, and transmits and receives communication data to and from the communication control means.

In a preferred embodiment of the second aspect, the communication control means and the plurality of sub-communication means are cascade-connected through a serial communication line.

In a preferred embodiment of the second aspect, the communication control means transmits reset data as predetermined serial data to the plurality of sub-communication means to thereby reset the plurality of sub-communication means.

In a preferred specific form of the first aspect, the communication control means has a reset terminal for receiving a reset signal and an external input terminal for receiving an externally generated reset signal, the communication control means transmitting the reset data to the plurality of sub-communication means when the reset of the communication control means is cancelled and when the externally generated reset signal is received.

More specifically, the first initialization means outputs a first reset signal to the external input terminal of the communication control means, the second initialization means outputs a second reset signal to the reset terminal of the communication control means, and the communication control means transmits the reset data to the plurality of sub-communication means when the second reset signal from the second initialization means is cancelled or when the first reset signal from the first initialization means is effective.

According to the image forming apparatus of the second aspect, similarly to the first aspect, the sub-communication means can be reset without providing special reset signal lines for transmitting a reset signal, and a communication reset signal can also be properly transmitted to the sub-communication means to reset the same when the system is in an abnormal state or when the power supply is turned off.

To attain the first object, according to a third aspect of the present invention, there is provided an initialization method applied to a communication system which comprises main control means for controlling the entire communication system, communication control means for controlling a serial communication, and a plurality of sub-communication means for transmitting serial data between themselves and the communication control means, or an image forming apparatus having the communication system, the initialization method comprising a first initialization step of resetting the main control means, and a second initialization step of resetting the communication control means, wherein the main control means and the communication control means are reset according to different setting conditions at the first and second initialization steps.

Preferably, the main control means is reset at the first initialization step if a power supply voltage of the communication system or the image forming apparatus is lower than a first predetermined value, and the communication control means is reset at the second initialization step when the power supply voltage of the communication system or the image forming apparatus is lower than a second predetermined value that is lower than the first predetermined value.

More preferably, when a power supply of the communication system or the image forming apparatus is turned on, the reset of the communication control means is cancelled at the second initialization step if a power supply voltage of the communication system becomes equal to the predetermined value, and the reset of the main control means is cancelled at the first initialization step if the power supply voltage becomes equal to the first predetermined value with passage of time, and when the power supply is turned off, the main control means is reset at the first initialization step if the power supply voltage becomes equal to the first predetermined value, and the communication control means is reset at the second initialization step if the power supply voltage becomes equal to the second predetermined value with passage of time.

In a preferred embodiment of the third aspect, the main control means controls communication of the communication control means, and transmits and receives communication data to and from the communication control means.

In a preferred embodiment of the third aspect, the communication control means and the plurality of sub-communication means are cascade-connected through a serial communication line.

In a preferred embodiment of the third aspect, the communication control means transmits reset data as predetermined serial data to the plurality of sub-communication means to thereby reset the plurality of sub-communication means.

In a preferred specific form of the third aspect, the communication control means has a reset terminal for receiving a reset signal and an external input terminal for receiving an externally generated reset signal, the communication control means transmitting the reset data to the plurality of sub-communication means when the reset of the communication control means is cancelled and when the externally generated reset signal is received.

More specifically, the first initialization step outputs a first reset signal to the external input terminal of the communication control means, the second initialization step outputs a second reset signal to the reset terminal of the communication control means, and the communication control means transmits the reset data to the plurality of sub-communication means when the second reset signal outputted by the second initialization step is cancelled or when the first reset signal outputted by the first initialization step is effective.

According to the initialization method of the third aspect, by applying the initialization method to the communication system or the image forming apparatus, similarly to the first and second aspects, the sub-communication means can be reset without providing special reset signal lines for transmitting a reset signal, and a communication reset signal can also be properly transmitted to the sub-communication means to reset the same when the system is in an abnormal state or when the power supply is turned off.

To attain the first object, according to a fourth aspect of the present invention, there is provided a storage medium that can be read by a computer and stores a program for executing an initialization method applied to a communication system which comprises main control means for controlling the entire communication system, communication control means for controlling a serial communication, and a plurality of sub-communication means for transmitting serial data between themselves and the communication control means, or an image forming apparatus having the communication system, wherein the initialization method comprises a first initialization step of resetting the main control means, a second initialization step of resetting the communication control means, and wherein the main control means and the communication control means are reset according to different setting conditions at the first and second initialization steps.

According to the storage medium of the fourth aspect, by reading the program for executing the initialization method from the storage medium and executing the program in the communication system or the image forming apparatus, similarly to the first to third aspects, the sub-communication means can be reset without providing special reset signal lines for transmitting a reset signal, and a communication reset signal can also be properly transmitted to the sub-communication means to reset the same when the system is in an abnormal state or when the power supply is turned off.

To attain the second object, according to a fifth aspect of the present invention, there is provided an image forming apparatus comprising a data transmission system having communication control means for controlling a serial communication that transmits serial data in synchronism with a synchronous signal, and a plurality of sub-communication means for transmitting serial data between themselves and the communication control means, control means for controlling the entire image forming apparatus, a first power supply for supplying power to at least one load connected to the image forming apparatus, and power supply control means for ON-OFF controlling the power supply under control of the control means, the power supply control means turning off the first power supply when detecting an abnormal communicating operation of the data transmission system.

Preferably, the image forming apparatus according to the fifth aspect further comprises a second power supply for supplying power to the entire image forming apparatus, wherein when the second power supply is turned on, the control means controls the power supply control means to turn on the first power supply after confirming that a communicating operation of the data transmission system has been executed.

Typically, the abnormal communicating operation of the data transmission system is an abnormal operation of the sub-communication means, or an abnormal operation of the communication control means.

In a preferred embodiment of the fifth aspect, the image forming apparatus further comprises reset means having a reset function of resetting the entire image forming apparatus, and a watchdog function of monitoring a controlling operation of the power supply control means and detecting an abnormal controlling operation thereof, and protection means arranged at an upstream of the power supply control means, wherein the image forming apparatus operates the protection means when the abnormal controlling operation of the power supply control means is detected.

In a further preferred embodiment of the fifth aspect, the image forming apparatus further comprises a main switch, and wherein the protection means turns off the main switch.

According to the image forming apparatus of the fifth aspect, when there is an abnormal communicating operation of the serial transmission system that controls loads connected to the image forming apparatus and others through a serial communication, the power supply to the loads is directly turned off by the power supply control means, thus making it possible to protect the loads from operating abnormally.

Further, since the monitor function of monitoring the function of the power supply control means of turning off the power supply to the loads is provided, when an abnormal controlling operation of the power supply control means is detected, the protection means is operated to thereby further enhance the reliability of protection of the loads.

Further, when the power supply to the entire image forming apparatus is turned on, after it is confirmed that a communicating operation of the data transmission system has been properly executed, the power supply to the loads is turned on, to thereby prevent the loads from operating abnormally even if there is an abnormality in the data transmission system when the power supply is turned on.

To attain the second object, according to a sixth aspect of the present invention, there is provided a trouble compensation method applied to an image forming apparatus comprising a data transmission system having communication control means for controlling a serial communication that transmits serial data in synchronism with a synchronous signal, and a plurality of sub-communication means for transmitting serial data between themselves and the communication control means, control means for controlling the entire image forming apparatus; and a first power supply that supplies power to at least one load connected to the image forming apparatus, the trouble compensation method comprising an abnormal operation detection step of detecting an abnormal communicating operation of the data transmission system, and a power supply control step of turning off the first power supply under control of the control means when an abnormal communicating operation of the data transmission system is detected.

To attain the second object, according to a seventh aspect of the present invention, there is provided a storage medium that can be read by a computer and contains a program for executing a trouble compensation method applied to an image forming apparatus comprising a data transmission system having communication control means for controlling a serial communication that transmits serial data in synchronism with a synchronous signal, and a plurality of sub-communication means for transmitting serial data between themselves and the communication control means, control means for controlling the entire image forming apparatus; and a first power supply that supplies power to at least one load connected to the image forming apparatus, wherein the trouble compensation method comprising an abnormal operation detection step of detecting an abnormal communicating operation of the data transmission system, and a power supply control step of turning off the first power supply under control of the control means when an abnormal communicating operation of the data transmission system is detected.

To attain the second object, according to an eighth aspect of the present invention, there is provided an apparatus comprising a data transmission system having master communication means, and at least one sub-communication means, the master communication means and the at least one sub-communication means performing communication with one another, a first power supply for supplying power to at least one load connected to the at least one sub communication means, and switching means for permitting and stopping supply of power from the first power supply to said at least one load, and control means for controlling the switching means so as to stop the supply of the power when an abnormal communicating operation of the data transmission system is detected.

Preferably, when a power supply of the apparatus is turned on, the control means controls the switching means so as to supply the power after confirming that a communicating operating of the data transmission system has been executed.

Typically, the abnormal communicating operation of the data transmission system is an abnormal operation of the at least one sub-communication means, or an abnormal operation of the communication control means.

Preferably, the apparatus according to the eight aspect further comprises detection means for detecting an abnormal operation of the switching means, and second switching means arranged at an upstream of the switching means, wherein the second switching means is turned off when the detection means detects the abnormal operation of the switching means.

To attain the first object, according to a ninth aspect of the present invention, there is provided a communication apparatus comprising main control means, communication control means for controlling communication with at least one sub-communication means, first initialization means for resetting the main control means, and second initialization means for resetting the communication control means, wherein the first initialization means and the second initialization means reset the main control means and the communication control means, respectively, according to different setting conditions.

Preferably, the first initialization means resets the main control means when a power supply voltage is lower than a first predetermined value, and the second initialization means resets the communication control means when the power supply voltage is lower than a second predetermined value that is lower than the first predetermined value.

Also preferably, the communication apparatus is cascade-connected to the at least one sub-communication means through a serial communication line.

Also preferably, the communication apparatus transmits reset data to the at least one sub-communication means to thereby reset the at least one sub-communication means.

Preferably, the communication apparatus transmits reset data to the at least one sub-communication means in response to a reset signal from the first initialization means.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
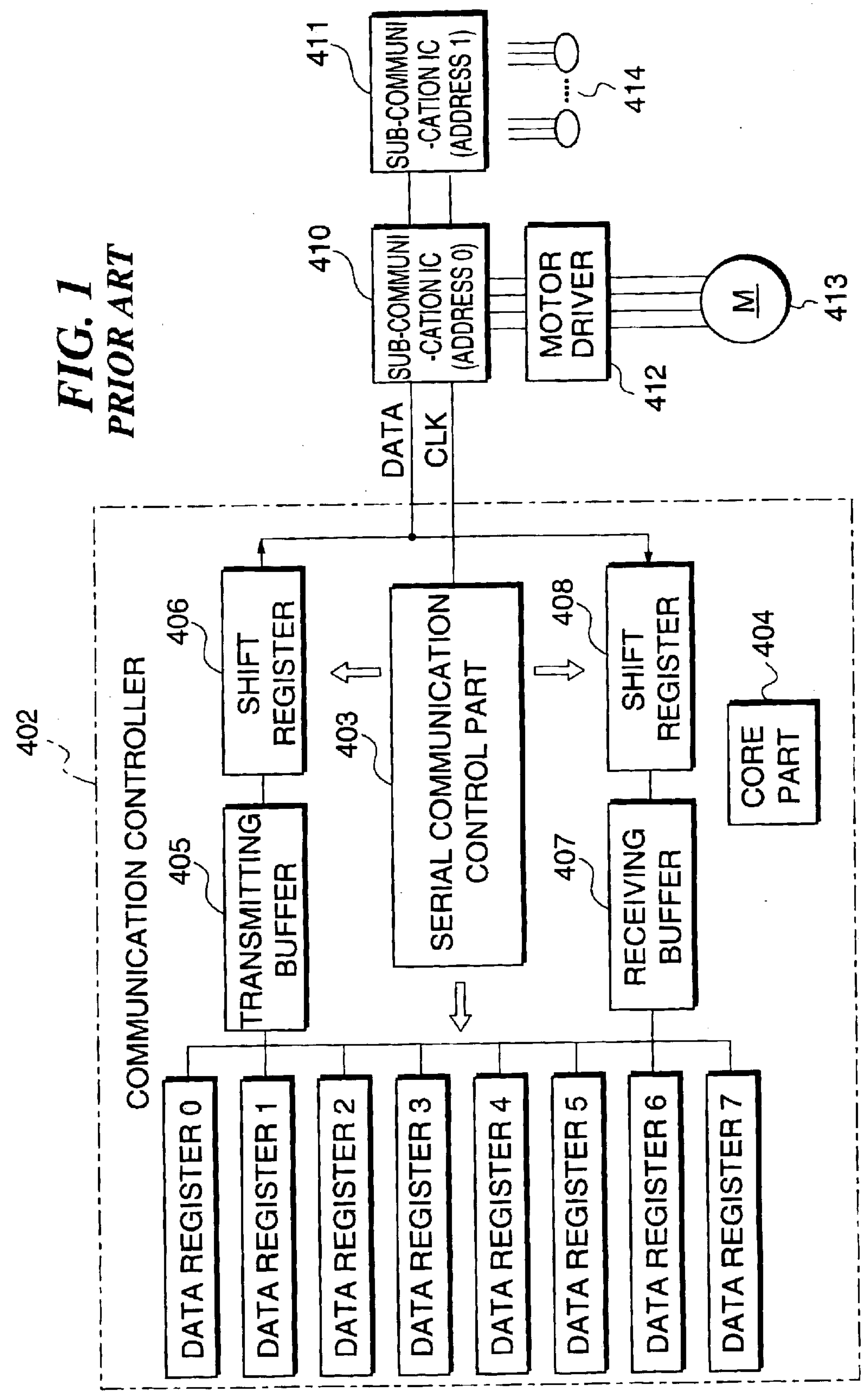
FIG. 1 PRIOR ART
FIG. 1 is a block diagram showing an example of a serial communication system according to a prior art.
Figure 2:
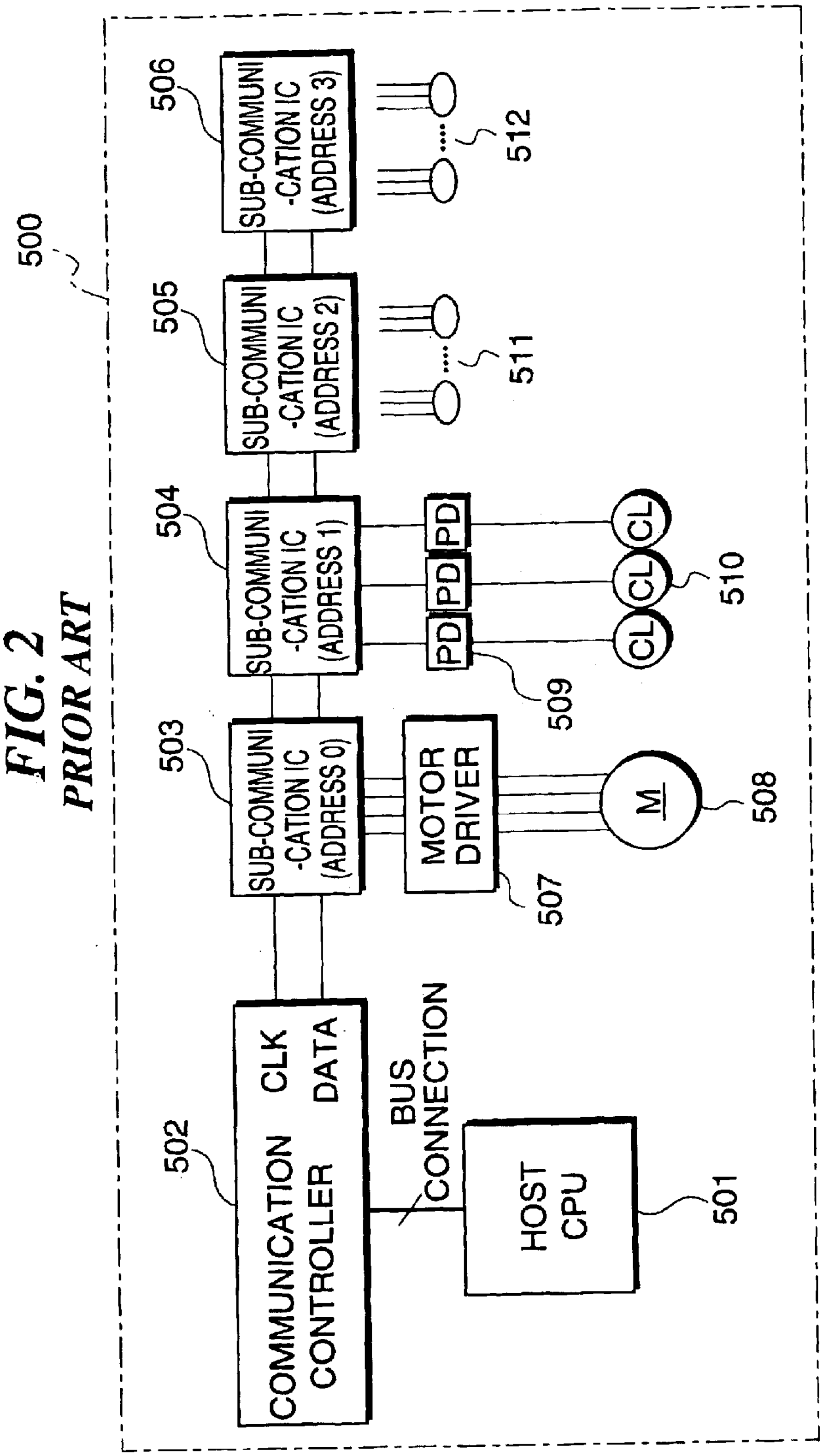
FIG. 2 PRIOR ART
FIG. 2 is a block diagram showing an example of a serial communication system incorporated in an image forming apparatus according to the prior art.
Figure 3:
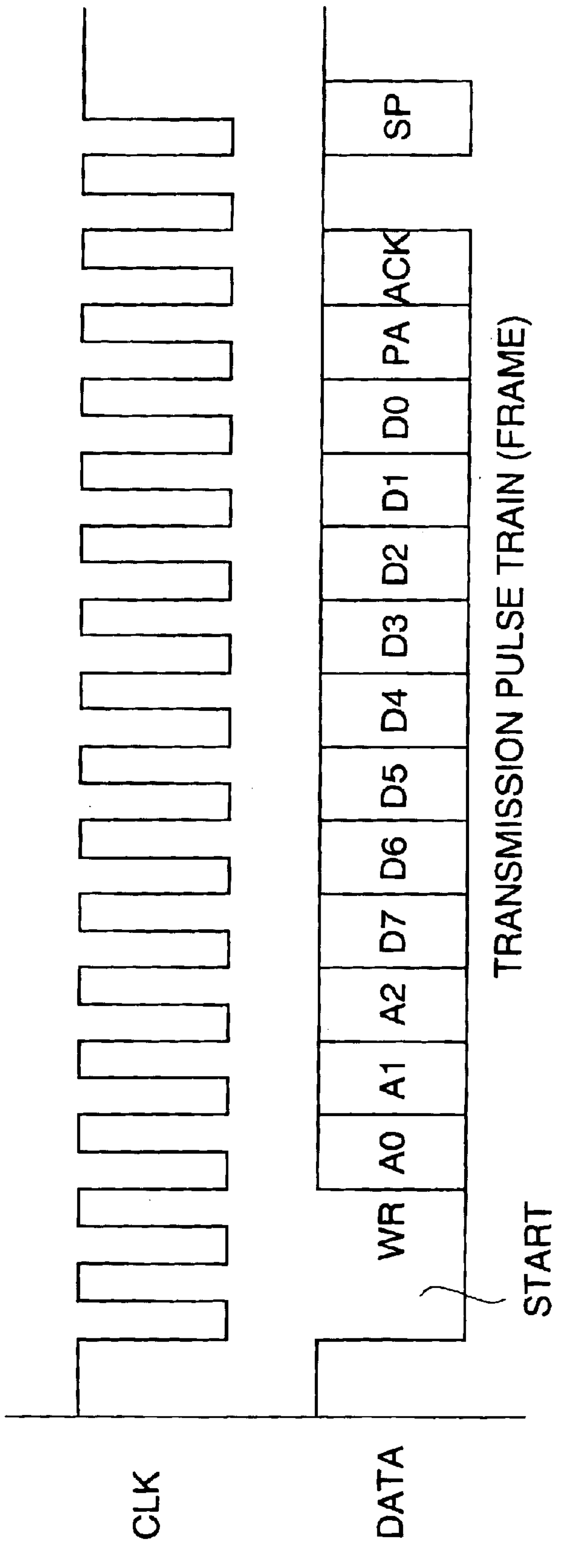
FIG. 3 PRIOR ART
FIG. 3 is a time chart showing an example of the structure of a transmission pulse train in the communication system in FIG. 3.
Figure 4:
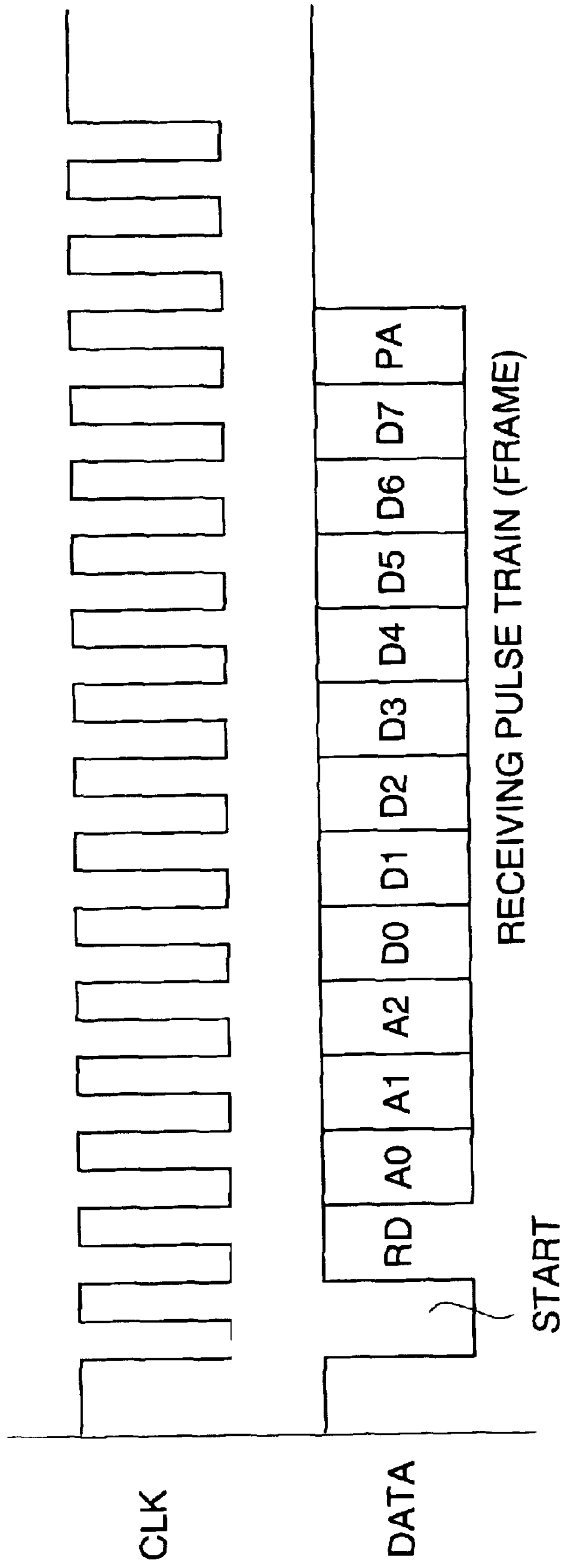
FIG. 4 PRIOR ART
FIG. 4 is a time chart showing an example of the structure of a receiving pulse train in the communication system in FIG. 3.
Figure 5:
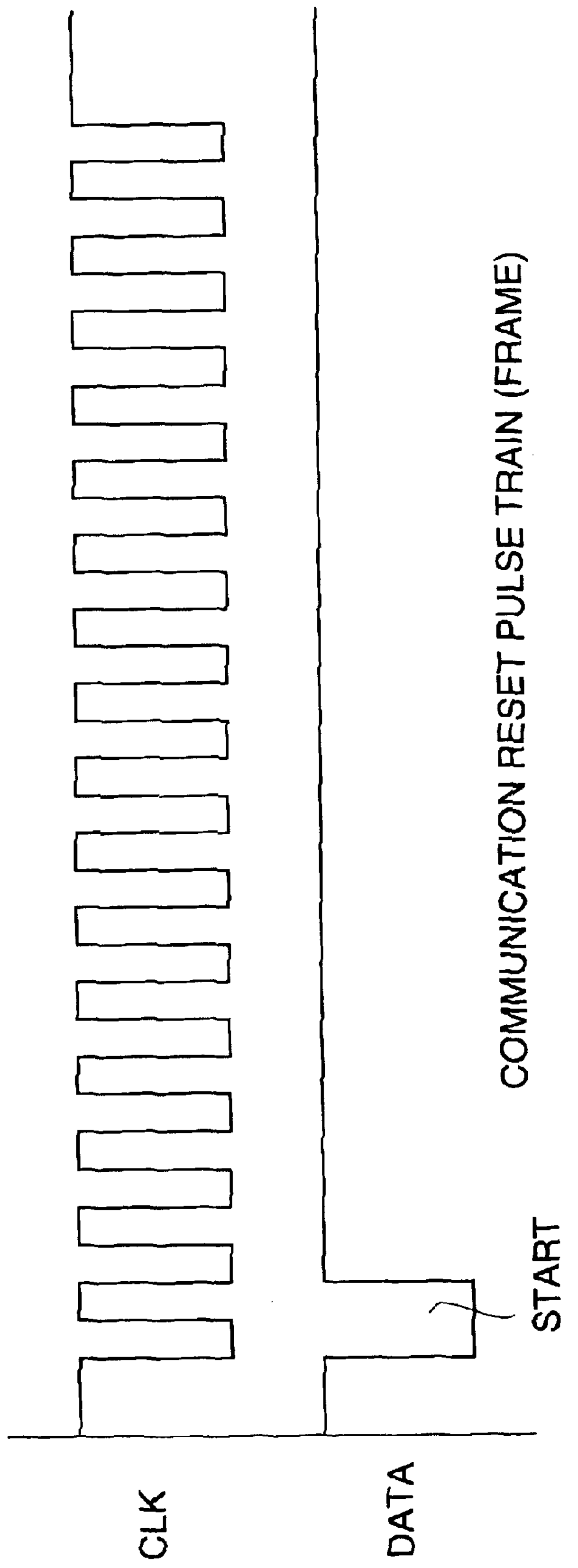
FIG. 5 PRIOR ART
FIG. 5 is a time chart showing an example of the structure of a communication reset pulse train in the communication system in FIG. 3.

Some preferred embodiments of the present invention will be described in detail by referring to the drawings.

First, there will be explained the outline of the entire structure of an image forming apparatus according to a first embodiment of the present invention with reference to FIGS. 6A to 7B. The image forming apparatus according to the first embodiment is applied to a copying machine, which forms images by an electrophotography.

Figure 7B:
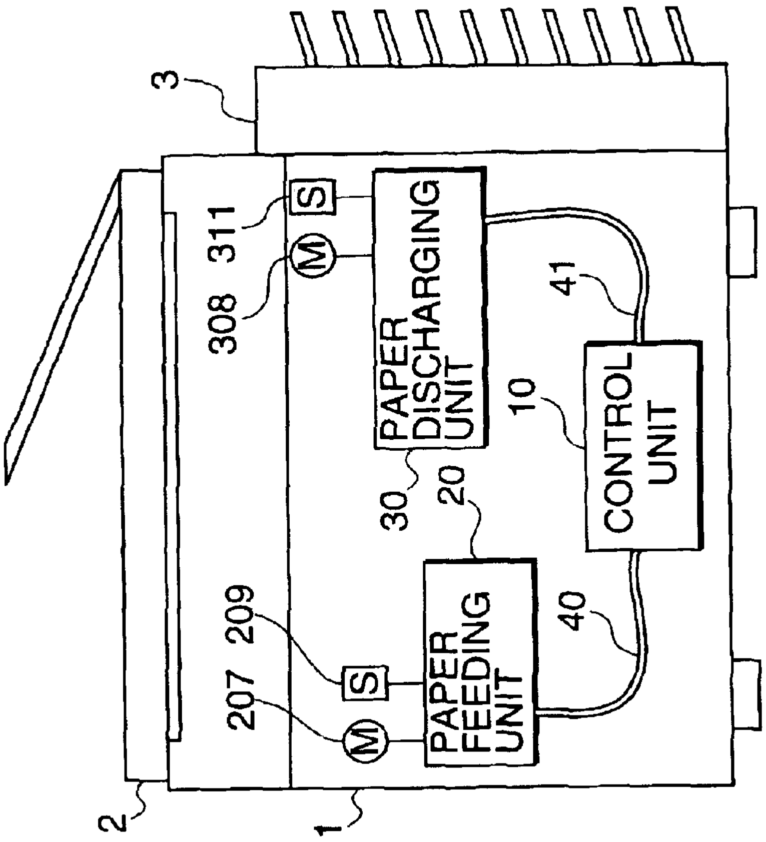
FIG. 7B is a back view of the internal structure of the body of the image forming apparatus in FIG. 7A.
Figure 7A:
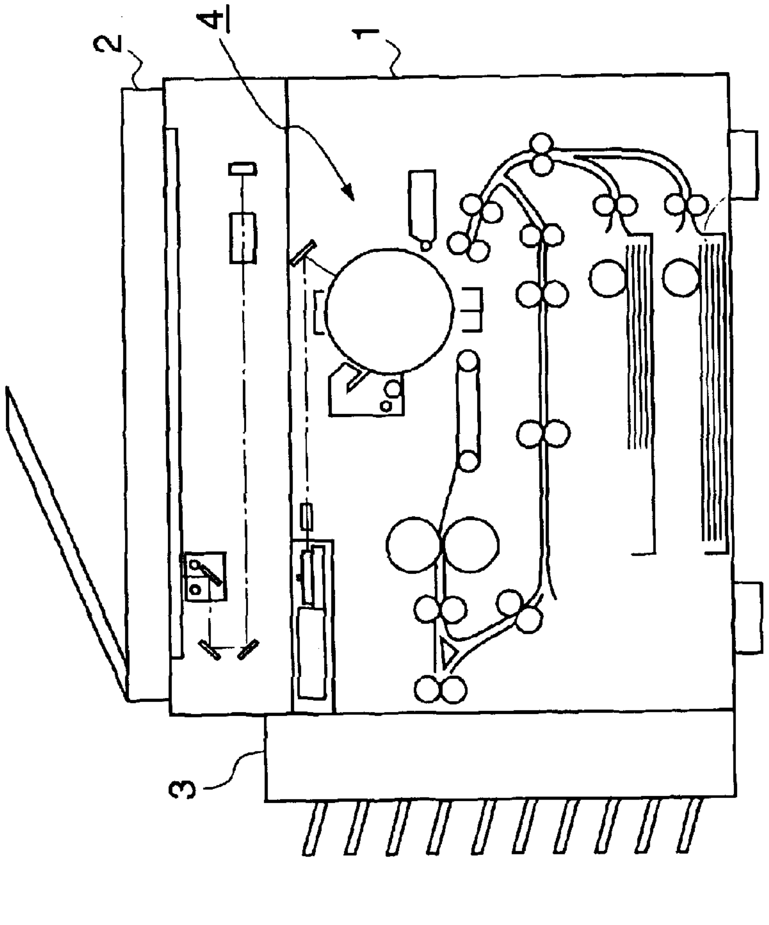
FIG. 7A is a front view showing the internal structure of a body of the image forming apparatus according to the first embodiment.

FIGS. 7A and 7B are a front view and a back view, respectively, showing the internal structure of a body of the image forming apparatus according to the first embodiment.

The image forming apparatus of the present embodiment is comprised of an image forming apparatus (copying machine) body 1, a recirculating automatic document feeder (RDF) 2, and a sorter 3. An image formation part 4 for electrification, development, transfer and the like, a control unit 10, a paper feeding unit 20, a paper discharging unit 30, motors 207, 308, sensors 209, 311, and the like are built in the body 1. FIGS. 7A and 7B illustrate only part of the motors and the sensors.

The recirculating automatic document feeder (RDF) 2 automatically feeds documents to be copied to a reading position. The sorter 3 discharges the copied paper. The control unit 10 controls the entire image forming apparatus. The paper feeding unit 20 controls the feeding of paper from a paper feeding cassette. The paper discharging unit 30 controls the discharge of the copied paper.

Figure 6A:
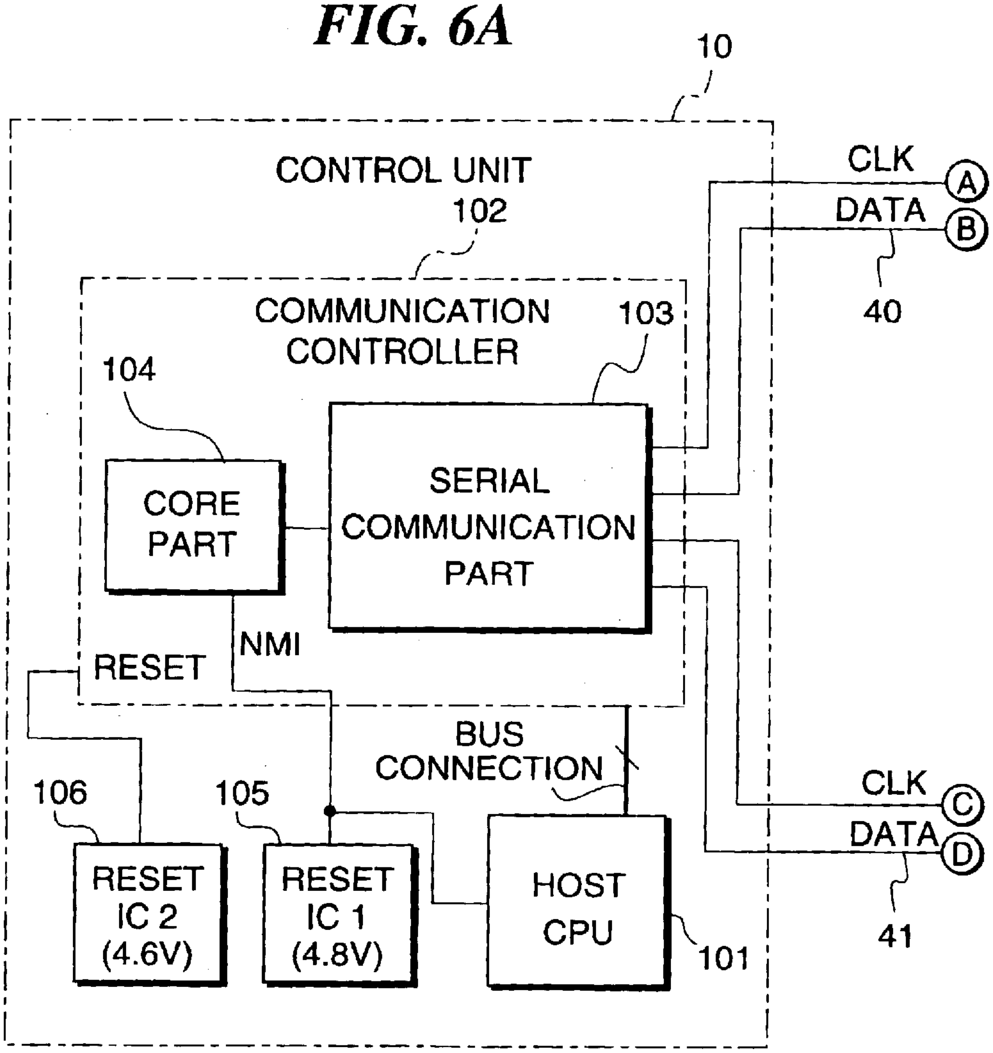
FIGS. 6A to 6C are block diagrams showing an example of a serial communication system comprised of a control unit, a paper feeding unit and a paper discharging unit connected to one another through a communication line in an image forming apparatus according to a first embodiment of the present invention.
Figure 6B:
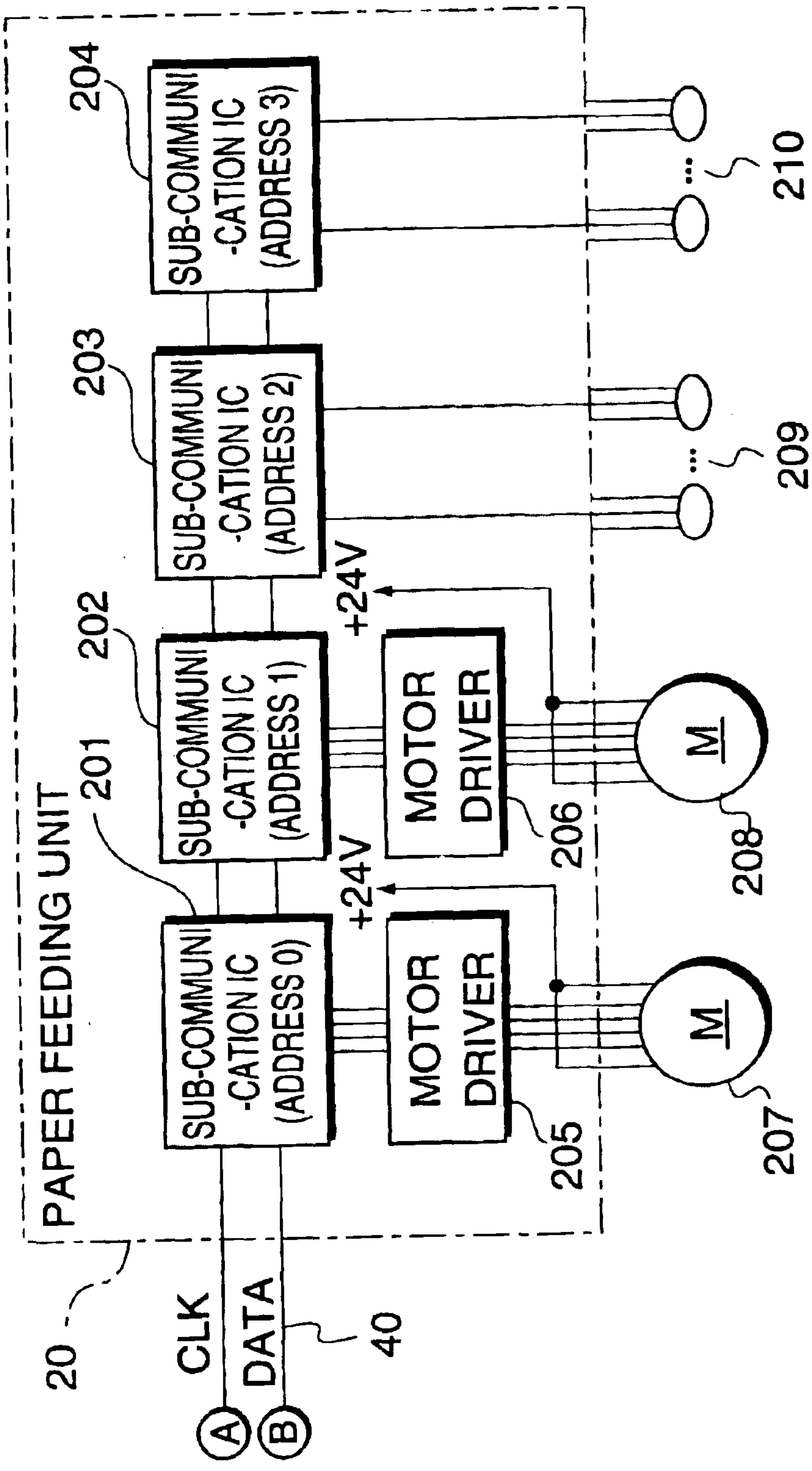
Figure 6C:
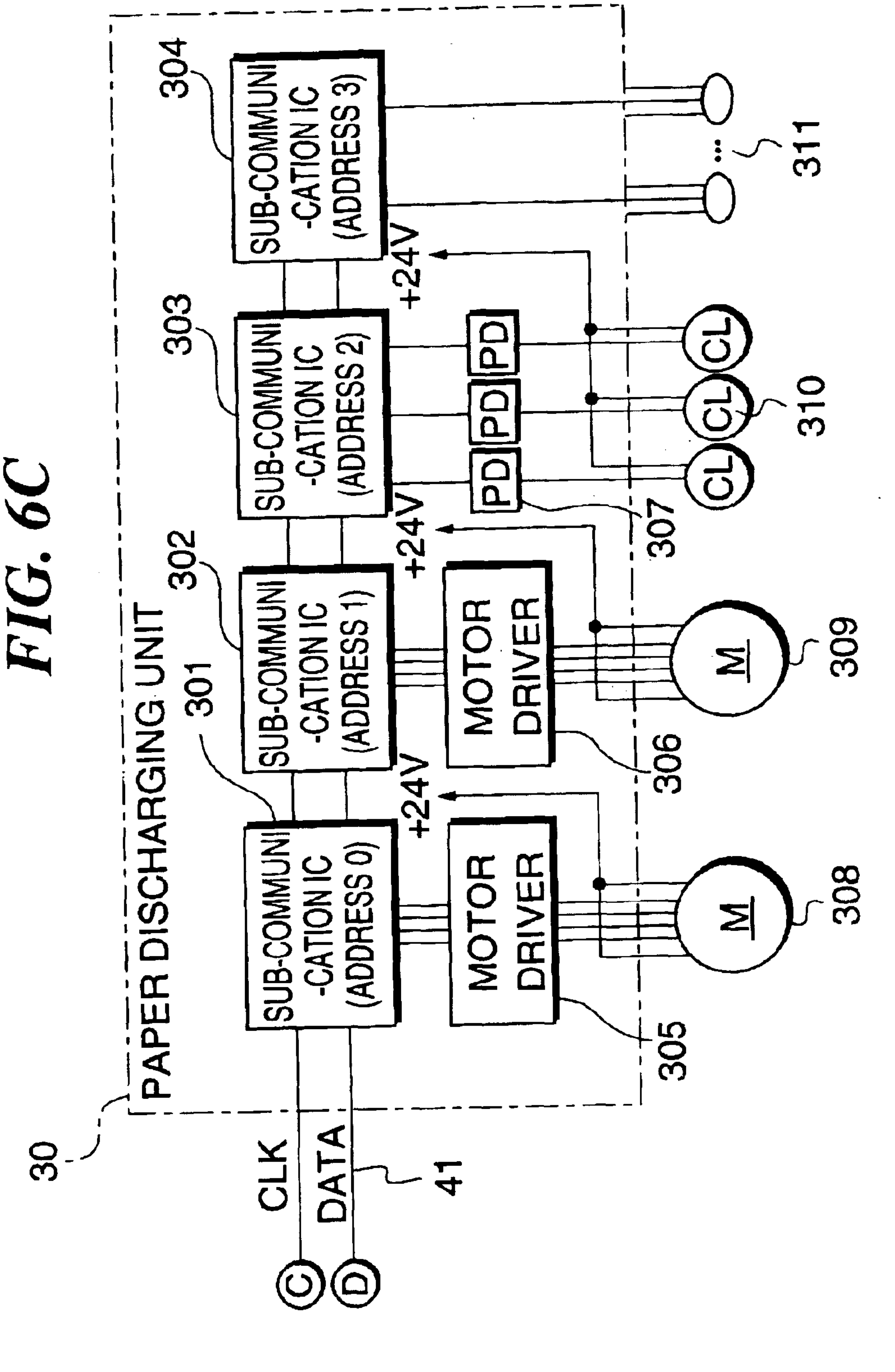

FIGS. 6A to 6C are block diagrams showing an example of a serial communication system which is comprised of the control unit 10, the paper feeding unit 20 and the paper discharging unit 30 connected through communication lines. The control unit 10 is comprised of a host CPU 101, a communication controller 102 having a serial communication part 103 and a core part 104, a first reset IC 105 (IC 1), and a second reset IC 106 (IC 2). The paper feeding unit 20 has sub-communication ICs 201–204, and motor drivers 205–206. The paper discharging unit 30 has sub-communication ICs 301–304, motor drivers 305–306, and a PD (a driver) 307. In FIGS. 6A to 6C, reference numerals 40, 41 denote communication lines; 207, 208, 308, 309 motors; 209, 210, 311 sensors; and 310 a clutch.

The control unit 10 including the communication controller 102, the paper discharging unit 20 including the sub-communication ICs 201–204, and the sub-communication ICs 301–304 are connected through communication lines 40, 41. Each of the two communication lines 40, 41 is comprised of a clock (CLK) line and a data (DATA) line.

In the control unit 10, the host CPU 101 is a central processing unit that controls the copying machine according to a program. The host CPU 101 is connected to the communication controller 102 through a bus, and gives instructions relating to the communication to the communication controller 102 and transmits and receives data to and from the communication controller 102. The communication controller 102 is a communication control means for controlling the serial communication for transmitting or receiving predetermined data in time sequence, on the communication lines 40, 41. The first reset IC 105 resets the entire system including the host CPU 101. The second reset IC 106 resets the communication controller 102.

The communication controller 102 is comprised of the serial communication part 103 and the core part 104. The serial communication part 103 performs the serial communication between the sub-communication ICs 201–204 on the paper feeding unit 20 and the sub-communication ICs 301–304 on the paper discharging unit 30. The core part 104 controls the reset for the sub-communication ICs 201–204 and the sub-communication ICs 301–304, and instructs the serial communication part 103 to transmit a reset pulse train. The communication controller 102 has a reset input terminal RESET, and an external input terminal NMI.

The first reset IC 105 is adapted to reset the entire system except for the communication controller 102 when a power supply voltage (system voltage) of the serial communication system is lower than a first predetermined value (e.g., 4.8V). A reset signal outputted from the first reset IC 105 is delivered to the entire system including the host CPU 101 and a terminal NMI of the communication controller 102. The second reset IC 106 is adapted to reset the communication controller 102 when the system voltage is lower than a second predetermined value (e.g., 4.6V) that is lower than the first predetermined value. A reset signal outputted from the second reset IC 106 is delivered to a reset input terminal RESET of the communication controller 102.

The paper feeding unit 20 is provided with, for example, the four sub-communication ICs 301 (address 0)–304 (address 3) as sub-communication means. The sub-communication ICs 201–202 are connected to motor drivers 205, 206, respectively, for driving the motors 207, 208. Connected to the sub-communication IC 303 is connected a driver 307 for driving a plurality of clutches 310 arranged at a paper discharging part in the copying machine. Connected to the sub-communication IC 304 are a plurality of sensors arranged at the paper discharging part in the copying machine.

The combinations of motors, sensors and the like connected to the sub-communication ICs 201–204 and the sub-communication ICs 301–304 should not be restricted to this embodiment.

Figure 8:
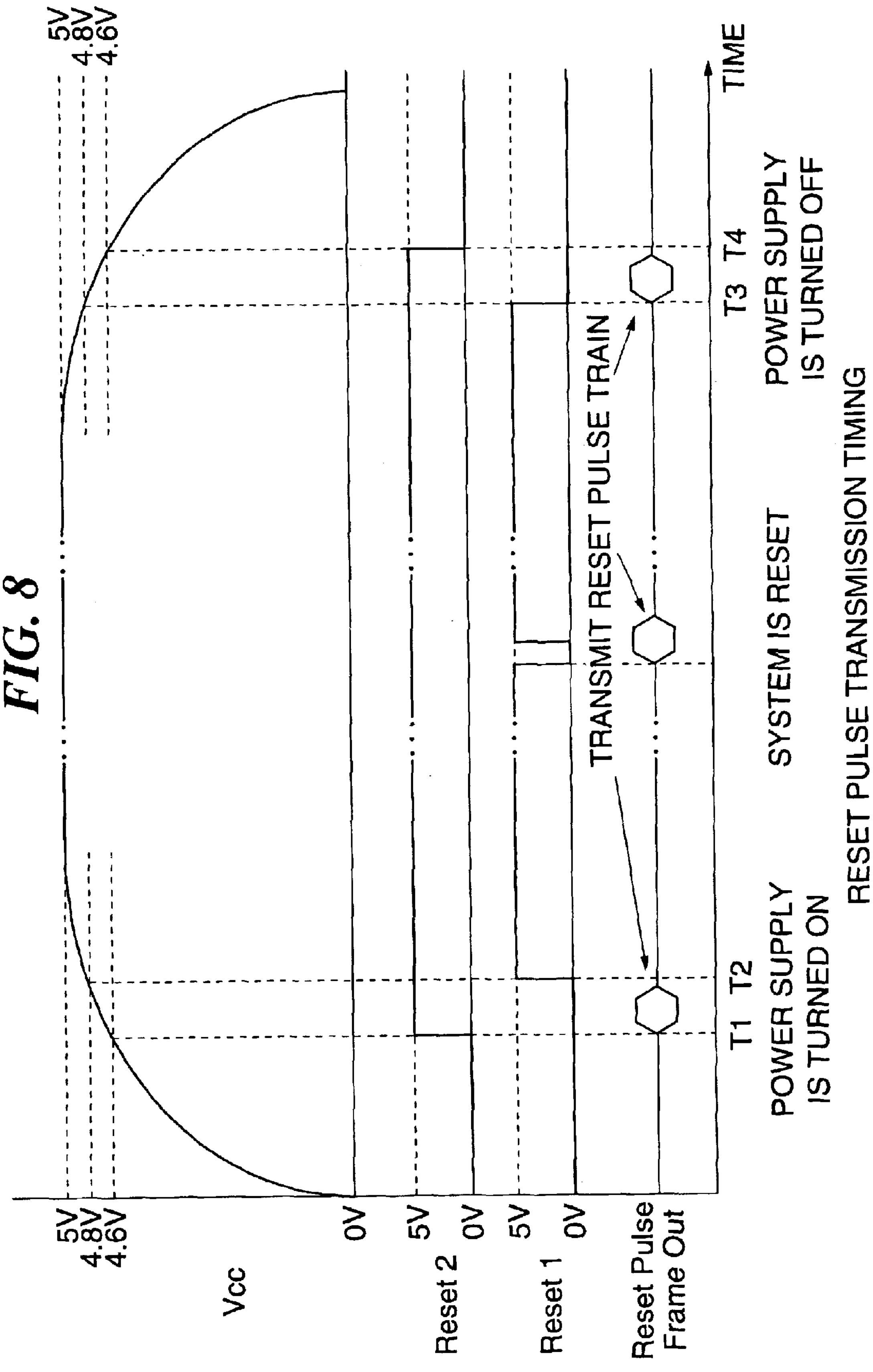
FIG. 8 is a time chart showing reset pulse train transmitting timing in the image forming apparatus according to the first embodiment.

Referring next to FIG. 8, a description will be given of an operation, in which the communication controller 102 of the control unit 10 resets the sub-communication ICs 201–204 of the paper feeding unit 20 and the sub-communication ICs 301–304 of the paper discharging unit 30 by transmitting the reset pulse train to the communication lines 41, 42 in the above-described image forming apparatus according to the present embodiment. FIG. 8 is a time chart showing reset pulse train transmitting timing in the image forming apparatus according to the present embodiment.

First, a description will be given of the operation when a power supply is turned on. When the power supply voltage Vcc reaches the second predetermined value (4.6V), a reset signal Reset 2 from the second reset IC 106 of the control unit 10 becomes "H" (the time T1 in FIG. 8), so that the communication controller 102 is released from its reset state. Upon the release of the reset state, the core part 104 of the control unit 10 sets a communication reset flag (not shown in FIG. 8) in the serial communication part 103. When the communication reset flag is set, the serial communication part 103 transmits the reset pulse train to the communication lines 40, 41. Immediately upon receipt of the reset pulse train, the sub-communication ICs 201–204 of the paper feeding unit 20 and the sub-communication ICs 301–304 of the paper discharging unit 30 are reset.

When the power supply voltage Vcc reaches the first predetermined value (4.8V), a reset signal 1 from the first reset IC 105 of the control unit 10 becomes "H" (the time T2 in FIG. 8), so that the entire system including the host CPU 101 but except for the communication controller 102 is released from its reset state. Upon the release of the reset state, the host CPU 101 of the control unit 10 starts operating the image forming apparatus (copying machine).

A description will now be given of the operation in the case where the system is reset. For example, if the CPU 101 of the control unit 10 runs out of control and a watchdog function detects it, the core part 104 of the control unit 10 sets the communication reset flag in the serial communication part 103 by a falling edge of the reset signal from the terminal MNI when the reset signal Reset 1 from the first reset IC 105 of the control unit 10 becomes "L". When the communication reset flag is set, the serial communication part 103 of the control unit 10 transmits the reset pulse train to the communication lines 40, 41. Immediately upon receipt of the reset pulse train, the sub-communication lines ICs 201–204 of the paper feeding unit 20 and the sub-communication lines ICs 301–304 are reset.

A description will now be given of the operation when the power supply is turned off. When the power supply voltage Vcc reaches the first predetermined voltage (4.8V), the reset signal Reset 1 from the first reset IC 105 of the control unit 10 becomes "L" (the time T3 in FIG. 8) to reset the entire system except for the communication controller 102. When the reset signal Reset 1 becomes "L", the core part 104 of the control unit 10 sets the communication reset flag in the serial communication part 103 by a falling edge of the reset signal from the terminal NMI. When the communication reset flag is set, the serial communication part 103 of the control unit 10 transmits the reset pulse train to the communication lines 40, 41. Immediately upon receipt of the reset pulse train, the sub-communication lines ICs 201–204 of the paper feeding unit 20 and the sub-communication lines ICs 301–304 are reset.

When the power supply voltage Vcc is lowered to the second predetermined voltage (4.6V), the reset signal Reset 2 from the second reset IC 106 of the control unit 10 becomes "L" (the time T4 in FIG. 8) to reset the communication controller 102.

The period of time between T1 and T2 and the period of time between T3 and T4 are determined to be not shorter than a period of time after the communication controller 102 of the control unit 10 starts transmitting the reset pulse train and until the transmission of the reset pulse train is completed to reset all the communication ICs of the paper feeding unit 20 and the paper discharging unit 30.

The two reset ICs are used in the present embodiment, but the present invention should not be restricted to this. The terminal NMI is used as an external input terminal in the present embodiment, but the present invention should not be restricted to this. The core part of the communication controller transmits the reset pulse train in the present embodiment, but a hard circuit may transmit the reset pulse train.

As stated above, the image forming apparatus of the present embodiment is comprised of the host CPU 101 that controls the entire system, the communication controller 102 that controls the serial communication, the sub-communication ICs 201–204 and 301–304 that transmit the serial data between the communication controller 102 and themselves, the reset IC 105 that resets the entire system except for the communication controller 102 when the system voltage is lower than the first predetermined value (4.8V), and the second reset IC 106 that resets the communication controller 102 when the system voltage is lower than the second predetermined value (4.6V). Accordingly, the following operation and effects can be achieved.

When the power supply is on, the second reset IC 106 cancels the reset state when the power supply voltage reaches the second predetermined value (4.6V). When the power supply voltage reaches the first predetermined value (4.8V), the first reset IC 105 cancels the reset state. This starts the operation of the image forming apparatus. If the host CPU 101 runs out of control, the first reset IC 105 lowers the reset signal to thereby reset the entire image forming apparatus immediately. When the power supply is off; the first reset IC 105 lowers the reset signal when the power supply voltage reaches the first predetermined voltage (4.8V), and the second reset signal IC 106 lowers the reset signal when the power supply voltage reaches the second predetermined voltage (4.6V).

More specifically, there is a difference in potential between a reset potential of the first reset IC 105 and a reset potential of the second reset IC 106. This enables the communication controller 102 to start operating earlier than the host CPU 101 when the power supply is tuned on, and enables the communication controller 102 to finish operating later than the host CPU 101 when the power supply is turned off.

Accordingly, the sub-communication ICs can be reset without providing any special reset signal line for transmitting the reset signal. Moreover, the communication reset signal can be properly transmitted to the sub-communication ICs to reset them when the system runs unusually and when the power supply is off.

Figure 9A:
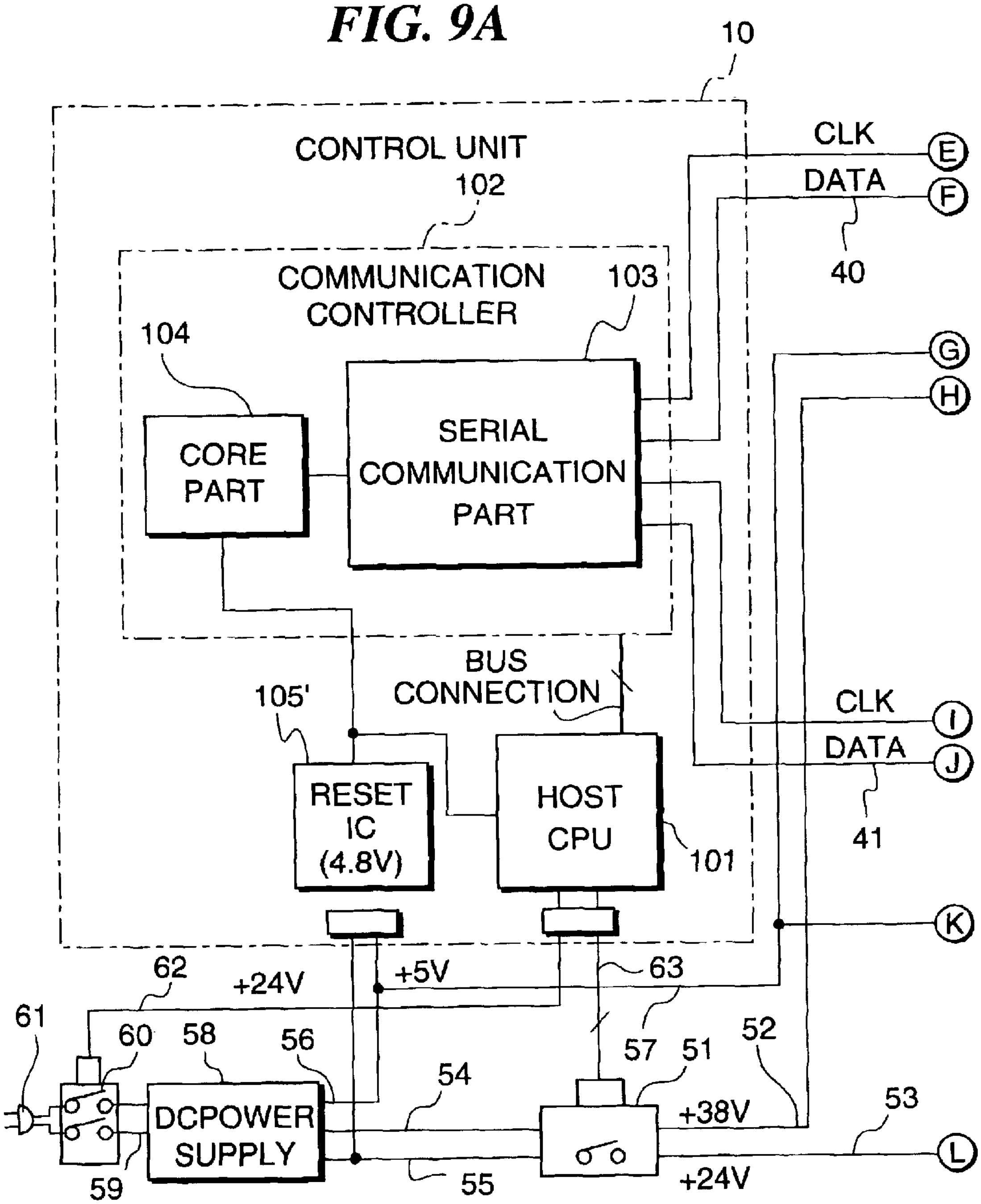
FIGS. 9A to 9C are block diagrams showing an example of a serial communication system comprised of a control unit, a paper feeding unit and a paper discharging unit connected to one another through a communication line in an image forming apparatus according to a second embodiment of the present invention.
Figure 9B:
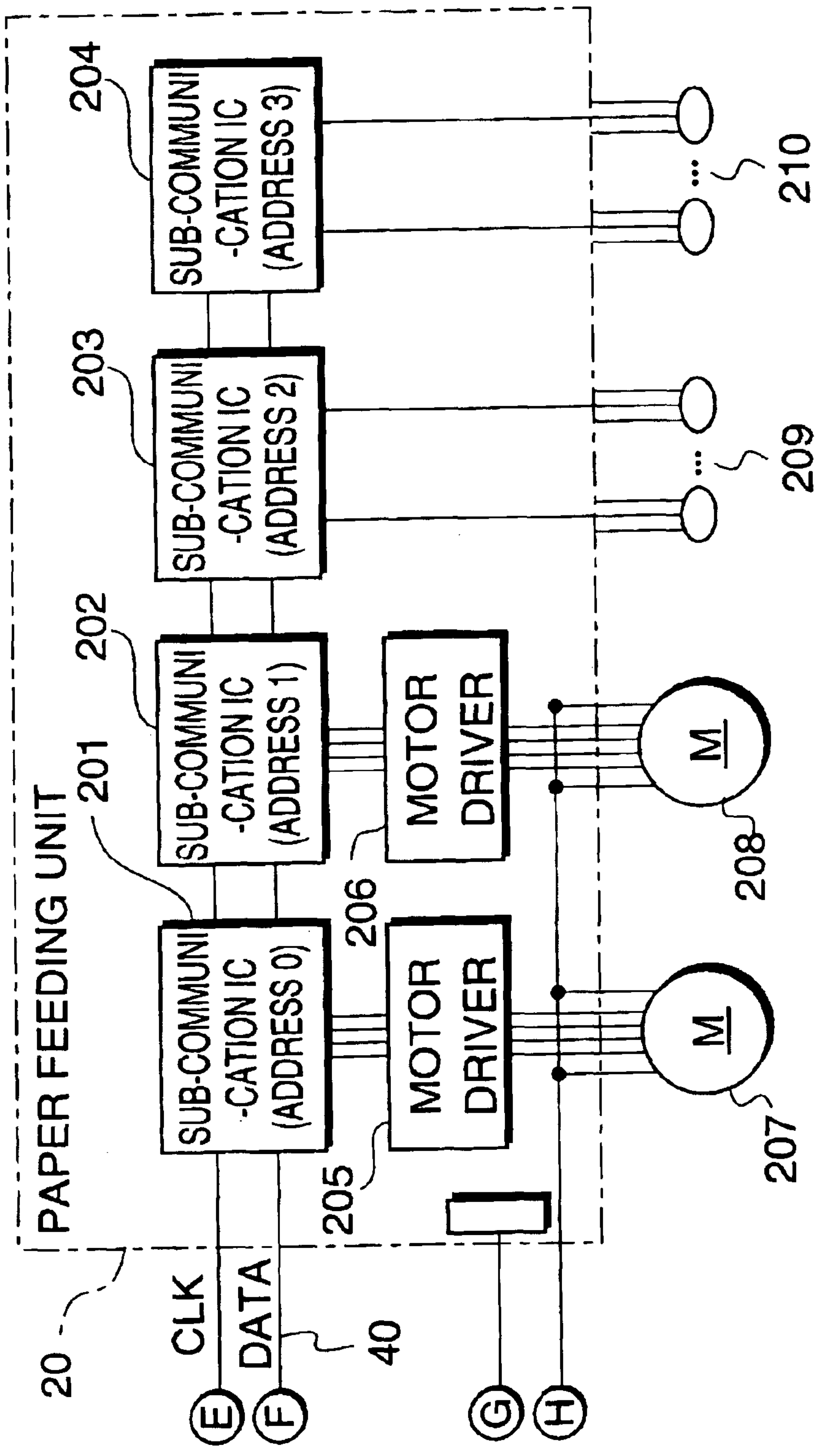
Figure 9C:
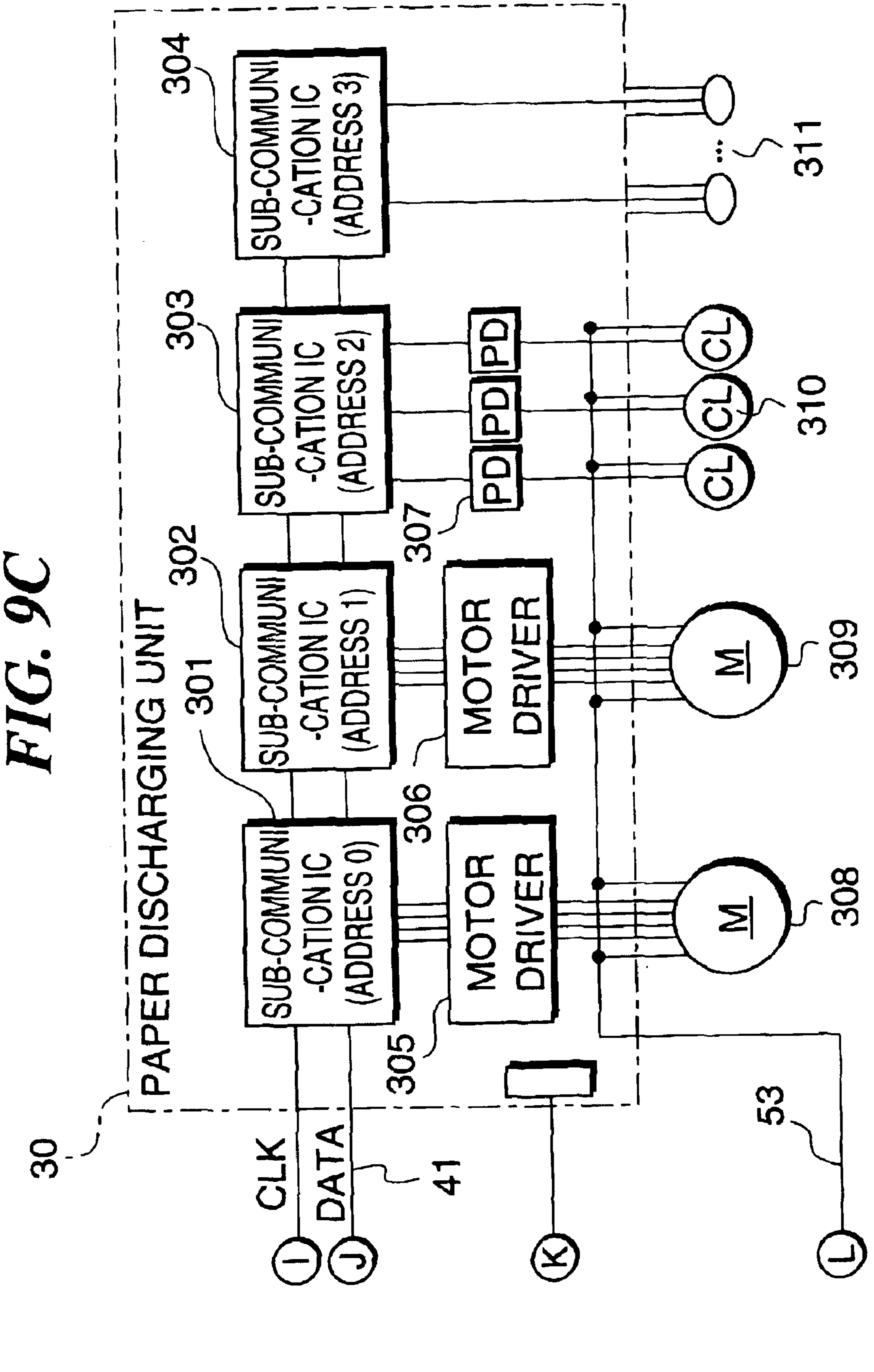

Referring next to FIGS. 9A to 9C, there will be explained a second embodiment of the present invention. FIGS. 9A to 9C are block diagrams showing an example of a serial communication system that is comprised of a control unit, a paper feeding unit and a paper discharging unit connected to one another through a communication line in an image forming apparatus according to the second embodiment. Elements and parts similar to those described with reference to FIGS. 6A to 6C are denoted by the same reference numerals, and a detailed description of them is omitted.

The control unit 10 has a single reset IC 105' instead of the reset ICs 105, 106.

The reset IC 105' is connected to the communication controller 102 through a terminal RESET as the reset input terminal. When the system voltage is lower than the first predetermined value (4.8V), the reset IC 105' resets the communication controller 102 and the entire system. The reset IC 105' is connected to the host CPU 101 and the reset terminal of the communication controller 102, and supplies a reset signal to them. A relay 51 is connected to the reset IC 105'. The reset IC 105' has a function of monitoring the power supply and a watchdog function of monitoring the operation of the host CPU 101 and the relay 51 to detect an abnormal state thereof.

Figure 10:
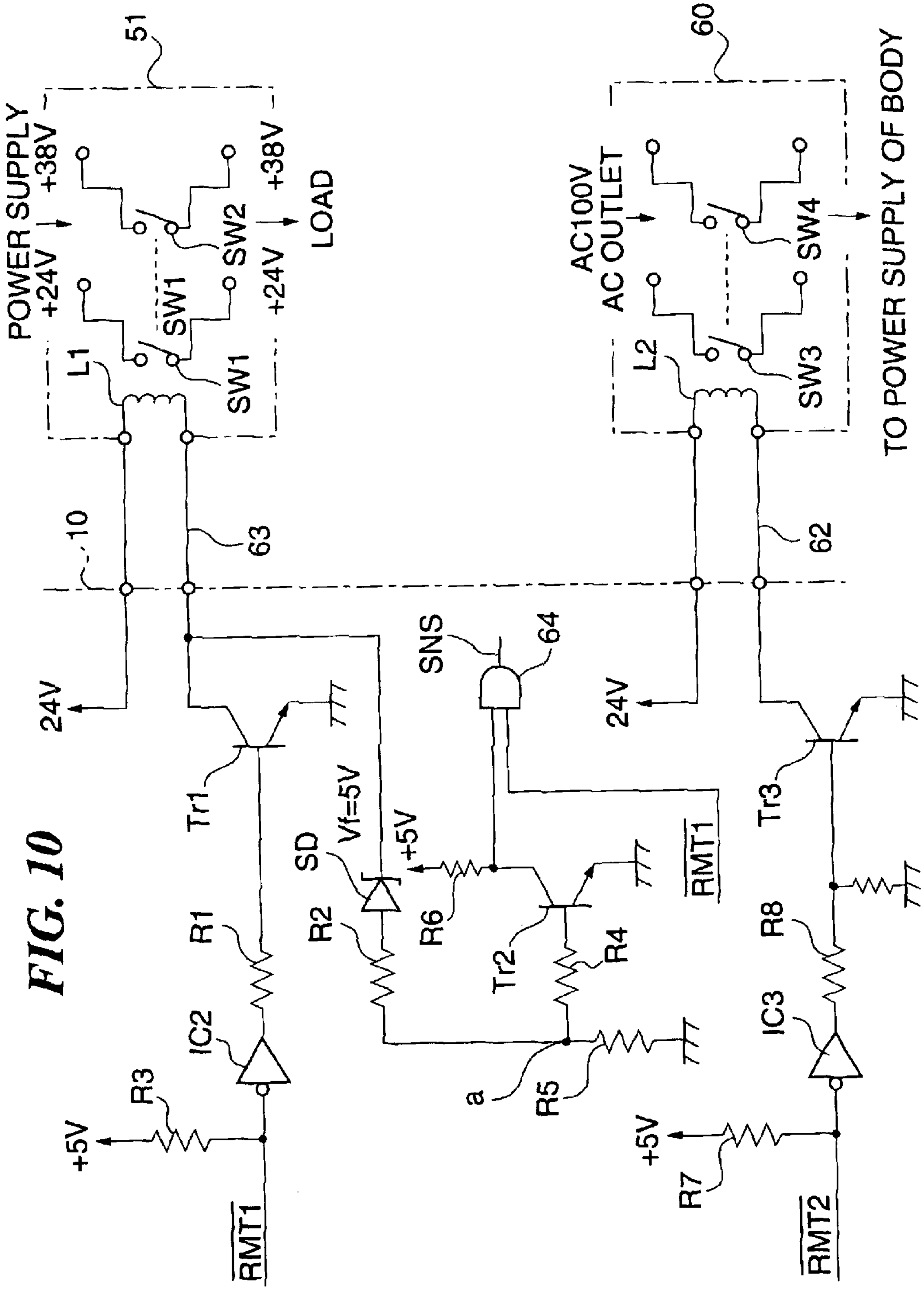
FIG. 10 is a circuit diagram showing a power supply control circuit including a relay and a switch of FIG. 9.

In addition to the resetting function of resetting the receiving side of the communication, the relay 51 (the relay 51 includes two circuits, and has two built-in switches that are commonly controlled) for turning on and off the power supply for dynamic loads, and a main power supply switch 60 for turning off the power supply for the entire system are connected to the host CPU 101. The host CPU 101 is capable of controlling the relay 51 and the power supply switch 60. Reference numeral 61 denotes an AC power supply connection plug. FIG. 10 shows a power supply control circuit. FIG. 10 is a circuit diagram showing the power supply control circuit including the relay 51 and the power supply switch 60 in FIG. 9A. Before a detailed description of the power control circuit in FIG. 10, there will be explained how to cope with the abnormal state of the communication in different situations.

1) When the power supply is turned on

When the power supply switch 60 is operated to turn on the power supply, an alternating current AC is supplied to a DC power supply 58, which outputs four kinds of DC voltages (+5V, 24V and +38V in the present embodiment). The first DC voltage of +24V is supplied to motors 308, 309 as loads through a line 55, the relay 51 and a line 53. The second DC voltage of +38V is supplied to motors 207, 208 as loads through a line 54, the relay 51 and a line 52. The third DC voltage of +24V is supplied to the control unit 10 through a line 56. The fourth DV voltage of +5V is supplied to the control unit 10, the paper feeding unit 20 and the paper discharging unit 30 through a line 57.

The DC power supply 58 is constructed in such a manner that the fourth DC voltage rises first and then the other voltages rise. The reset IC 105' outputs the reset signal for a predetermined period of time after the DC voltage of +5V rises. Accordingly, the host CPU 101 and the communication controller 102 are reset for the predetermined period of time. At this time, the host CPU 101 is constructed such that coils of the relay 51 and the power supply switch 60 connected to the host CPU 101 are not excited. The relay 51 is energized by carrying a current through a coil L1 (FIG. 10) thereof to turn on (close) switches SW1 and SW2 (FIG. 10). Since the coil L1 is not excited during the predetermined period of time, the power supply of +38V and 24V is not supplied to the loads of the paper feeding unit 20 and the paper discharging unit 30. Therefore, even if any one of the receiving sub-communication ICs of the paper feeding unit 20 and the paper discharging unit 30 at the receiving side of the serial communication operates abnormally and the reset cannot be performed properly when the power supply is turned on, and if a power supply voltage driving the loads is outputted; the loads can be protected from operating abnormally since the power supply voltage is not supplied to the loads. In the normal state, the loads never operate abnormally even if the power supply is supplied to the loads.

If the reset of the host CPU 101 and the communication controller 102 is cancelled upon passage of the predetermined period of time, the host CPU 101 and the communication controller 102 start operating. The host CPU 101 energizes the relay 51 after confirming the normal operation of the communication controller 102 and the sub-communication ICs 201–204 and 301–304. This enables a desired proper operation of the motors 207, 208, 308, 309 as the loads.

2) When the communication controller detects a malfunction of any one of the sub-communication ICs When the communication controller 102 detects the malfunction of any one of the sub-communication ICs 201–204 and 301–304, the communication controller 102 posts the malfunction to the host CPU 101 and generates a signal for stopping the operation of the loads and the like to all the sub-communication ICs 201–204 and 301–304, thus protecting the system. At this time, the host CPU 101 deenergizes the relay 51 to turn off the power supplied to the loads, thereby preventing the operation of the loads even when any one of the sub-communication ICs do not stop properly.

3) When the malfunction of the communication controller is detected

If the host CPU 101 cannot properly communicate with the communication controller 102 or if the host CPU 101 detects the malfunction of the communication controller 102, the relay 51 is deenergized to protect the loads from operating abnormally.

4) When the controller unit (when the host CPU operates abnormally) malfunctions The reset IC 105' has the watchdog function of automatically outputting the reset signal when pulses are not received at regular intervals from the host CPU 10. When the host CPU 101 operates abnormally, the reset IC 105' generates the reset signal to thereby reset the host CPU 101 and deenergize the relay 51, thus protecting the loads from operating abnormally.

5) When the relay 51 does not operate when the host CPU operates abnormally

The reset IC 105' monitors the operation of the relay 51 connected thereto by its relay operation monitoring function. If it is determined that the relay 51 does not operate when the relay 51 should be turned off, or if it is preferable to stop the operation of the entire system, the operation of the DC power supply 58 can be stopped. To stop the operation of the DC power supply 58, the coil L2 (FIG. 10) of the power supply switch 60 is excited to turned off (open) switches SW3 and SW4 (FIG. 10) of the power supply switch 60, thereby stopping the operation of the DC power supply 58 and stopping the supply of the power to the entire system.

In the present embodiment, the supply of the power to the entire system is stopped, but if the power supply is provided for each part of the system, the supply of the power to the loads may only be stopped.

Referring next to FIG. 10 and Table 1, there will be explained the structure and the control operation of the relay 51 and the power supply switch 60.

Table 1 shows the control operation of the power supply control circuit.

In FIG. 10, the host CPU 101 supplies control signals RMT1, RMT2, which are brought into a high impedance state when the host CPU 101 is reset. When the host CPU 101 is initialized, the control signals RMT1, RMT2 are at a high (H) level. Connected to the coil L1 of the relay 51 is a collector of a transistor TR1 for energizing and deenergizing the relay 51. When the transistor TR1 is turned on, the coil L1 is excited to turn on the switches SW1, SW2 of the relay 51. The signal RMT1 is supplied to a base of the transistor TR1 through a resistance R1 and an inverter IC IC2. When the signal RMT1 is low (L), an output of the inverter IC IC2 is high (H) and the transistor TR1 is turned on.

In this case, a Schottky diode SD with a Vf of about 5V is connected to the collector of the transistor TR1, a resistance R2 is connected to an anode of the Schottky diode SD, and a resistance R4 connected to a base of a transistor TR2 and a resistance R5 grounded are connected to the resistance R2 in order to check the operation of the relay 51. The resistances R4 and R5 are preselected such that a voltage at a junction a between the resistances R4 and R5 can be about 5V when the collector potential of the transistor TR1 is 24V if the transistor TR1 is off and a line 63 and the coil L1 of the relay 51 are normally connected. If the control signal RMT1 is at a high level and the transistor TR1 is off in this normal state, the collector of the transistor TR2 is at a low (L) level since the transistor TR2 is on. When the transistor TR2 is on, if the collector potential of the transistor TR1 goes low (L) or open due to the trouble of the coil L1, the line 63 or the transistor TR1, the potential at the junction a goes low (L) (GND level) so that the transistor TR2 is turned off. Thus, the collector potential of the transistor TR2 goes high (H) (5V). Therefore, an output signal of an AND circuit 64 whose one input terminal is connected to the collector of the transistor TR2 and whose other end is provided with the control signal RMT1, in other words, an error determination signal SNS becomes high to indicate the malfunction of the relay 51.

Table 1 shows the relationship between the level of the control signal RMT1, the ON/OFF state of the transistor TR1, the level of the error determination signal SNS, and the normal/abnormal state of the relay 51.

TABLE 1

| RESET IC1 | RESET | DURING NORMAL OPERATION HOST CPU | | | |
|---|---|---|---|---|---|
| RTM1 | Z (High IMPEDANCE) | H | | L | |
| Tr1 | OFF | OFF | | ON | |
| SNS | — | 51 NORMAL L | 51 AB-NORMAL H | 51 NORMAL L | 51 AB-NORMAL L |

A collector of a transistor TR3 is connected to a coil L2 of the power supply switch 60 through a line 62, and the control signal RMT2 is supplied to a base of the transistor TR2 through a resistance R8 and an inverter IC IC3. In order to turn off the power supply switch 60, the coil L2 needs to be excited. The transistor TR3 is turned on by setting the signal RMT2 to the low (L) level, thereby exiting the coil L2. The operation of the power supply switch 60 and the error determination signal SNS of the relay 51 will now be described with reference to Table 1.

When the host CPU 101 is reset, the control signals RMT1, RMT2 are in the high impedance state. Thus, the transistor TR1 and the relay 51 are off. At this time, the error determination signal SNS is not used to detect the state of the relay 51 or the transistor TR1. When the reset is cancelled, the transistor TR1 is turned off if the signal RMT1 from the host CPU 101 is high (H). At this time, the signal SNS for use in determining whether the transistor TR1 is turned off normally is supplied to the host CPU 101. Only when the relay 51 or the transistor TR1 malfunctions, the signal SNS is high (H). In other cases, the signal SNS is low (L). On the other hand, if the signal RMT1 is low (L), the transistor TR1 is turned on to energize the relay 51. At this time, the signal SNS is low (L) even if the relay 51 malfunctions. More specifically, the communication system operates normally when the relay 51 is capable of being turned on. It is therefore unnecessary to protect the apparatus.

According to the present embodiment described above, if a malfunction of any part of the communication system is detected, the communication system is not only reset, but also the supply of the power to the load system is stopped. This protects the apparatus that controls the loads and others by serial communication, and hence improves the safety of the apparatus. Further, this protecting operation is monitored, so that another protecting operation can protect the apparatus if the protecting operation does not function properly, to thereby further enhance the protective function.

The present invention may be applied to either a system comprised of multiple equipment or a system comprised of only one equipment. The present invention can be realized by hardware, and can also be realized in such a manner that the system or the apparatus is provided with a storage medium containing a program code of software realizing the above described functions of the above described embodiment, and a computer (or a CPU or a MPU) of the system or the apparatus reads the program code stored in the storage medium.

In this case, the program code read from the storage medium realizes the functions of the present embodiment, and the storage medium containing the program code constitutes the present invention.

Figure 11:
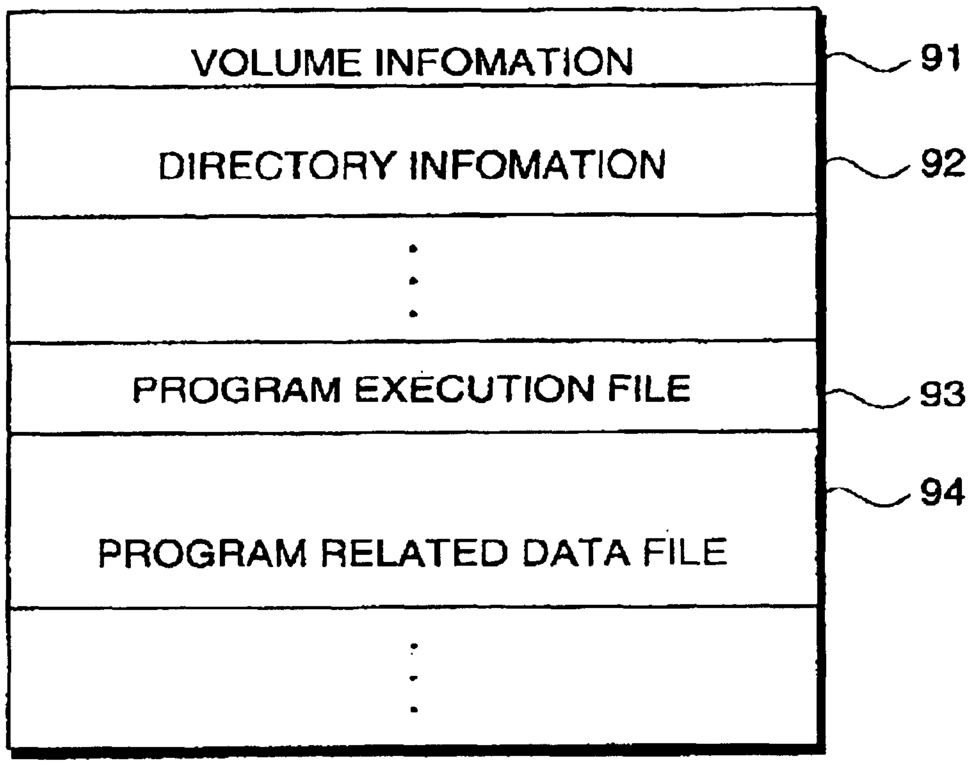
FIG. 11 is a view showing an example of the structure of contents in a storage medium that contains a program and related data for executing an initialization method and a trouble compensation method according to the present invention.

FIG. 11 is a block diagram showing an example of the storage medium that contains a program and related data for executing the initialization method or the trouble compensation method of the present invention.

The storage medium of the present invention contains, e.g., volume information 91, directory information 92, a program execution file 93 and a program related data file 94. The program used in the present invention is expressed in a program code by a process that will be described later.

The procedure for supplying the program and the related data for executing the initialization method or the trouble compensation method according to the present invention from the storage medium is not limited to the one in FIG. 11. For example, the program and the related data of the present invention are loaded into the image forming apparatus by equipment such as a computer in FIG. 12 in order to supply the program and the related data for executing the initialization method or the trouble compensation method of the present invention from the storage medium to the image forming apparatus according to either of the embodiments of the present invention and execute the program.

Figure 12:
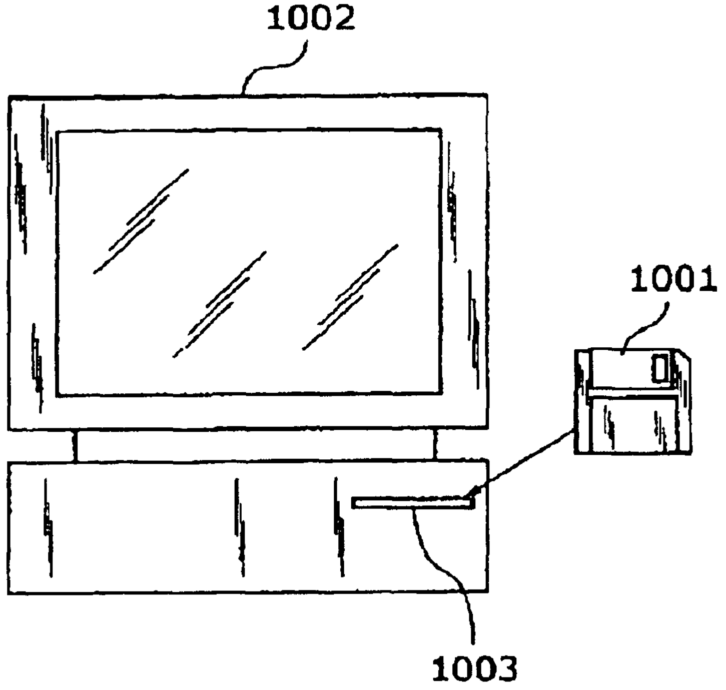
FIG. 12 is a schematic view useful in explaining how the program and the related data for executing the initialization method and the trouble compensation method according to the present invention are supplied from the storage medium to the system.

FIG. 12 shows an example wherein the pogrom and the related data for executing the initialization method or the trouble compensation method of the present invention are supplied from the storage medium to the apparatus. The program and the related data are supplied by inserting a storage medium 1001 such as a floppy disk and a CD-ROM into a storage medium insertion opening 1003 of a computer 1002. Then, the program and the related data of the present invention are installed once in a hard disk of the computer 1002 from the storage medium 1001, and are loaded into a RAM of the computer 1002 from the hard disk. Alternatively, they are directly loaded into the RAM without being installed in the hard disk. This enables the execution of the program and the related data.

The storage medium for supplying the program code is, for example, a floppy disk, a hard disk, an optical disk, a magneto-optical disk, a CD-ROM, a CD-R, a magnetic tape, a non-volatile memory card, and a ROM.

The functions of the above-described embodiments may be realized not only by executing the program code read by the computer, but also in such a manner that an OS working on the computer or the like executes a part or the whole of an actual process.

Of course, the functions of the above described embodiments are also realized in such a manner that the program code read from the storage medium is written into a memory of a capability expansion board inserted into the computer or a capability expansion unit connected to the computer, and then a CPU or the like of the capability expansion board or the capability expansion unit executes a part or the whole of an actual process according to commands of the program code.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A communication system comprising:

a main controller that controls the communication system;

a communication controller that controls a serial communication;

a plurality of sub-communication units that perform the serial communication with said communication controller;

a first resetting unit that is implemented by a circuit separate from said main controller and said communication controller and sets said main controller into a reset state; and a second resetting unit that is implemented by another circuit separate from said main controller and said communication controller and sets said communication controller into a reset state;

wherein:

said second resetting unit sets said communication controller into the reset state after said first resetting unit sets said main controller into the reset state when a power supply of the communication system is turned off;

said communication controller transmits reset data as predetermined serial data to said plurality of sub-communication units to thereby reset said plurality of sub-communication units if said first resetting unit sets said main controller into the reset state when the power supply of the communication system is turned off; and said second resetting unit sets said communication controller into the reset state after said communication controller transmits the reset data to said plurality of sub-communication units.

2. A communication system according to claim 1, wherein said first resetting unit sets said main controller into the reset state when a power supply voltage of the communication system is lower than a first predetermined value, and said second resetting unit sets said communication controller into the reset state when the power supply voltage of the communication system is lower than a second predetermined value that is lower than said first predetermined value.

3. A communication system according to claim 2, wherein:

when the power supply of the communication system is turned on, said second resetting unit cancels the reset state of said communication controller if the power supply voltage of the communication system becomes equal to the second predetermined value, and said first resetting unit cancels the reset state of said main controller if the power supply voltage becomes equal to the first predetermined value with passage of time; and when the power supply is turned off, said first resetting unit sets said main controller into the reset state if the power supply voltage becomes equal to the first predetermined value, and said second resetting unit sets said communication controller into the reset state if the power supply voltage becomes equal to the second predetermined value with passage of time.

4. A communication system according to claim 1, wherein said main controller controls communication of said communication controller, and transmits and receives communication data to and from said communication controller.

5. A communication system according to claim 1, wherein said communication controller and said plurality of sub-communication units are cascade-connected through a serial communication line.

6. A communication system according to claim 1, wherein said communication controller has a reset terminal for receiving a reset signal, and an external input terminal for receiving an externally generated reset signal, said communication controller transmitting the reset data to said plurality of sub-communication units when the reset state of said communication controller is cancelled and when the externally generated reset signal is received.

7. A communication system according to claim 6, wherein said first resetting unit outputs a first reset signal to said external input terminal of said communication controller, said second resetting unit outputs a second reset signal to said reset terminal of said communication controller, and said communication controller transmits the reset data to said plurality of sub-communication units when the second reset signal from said second resetting unit is cancelled or when the first reset signal from said first resetting unit is effective.

* * * * *